_United States Patent Office_  
3,614,904  
Patented Oct. 26, 1971

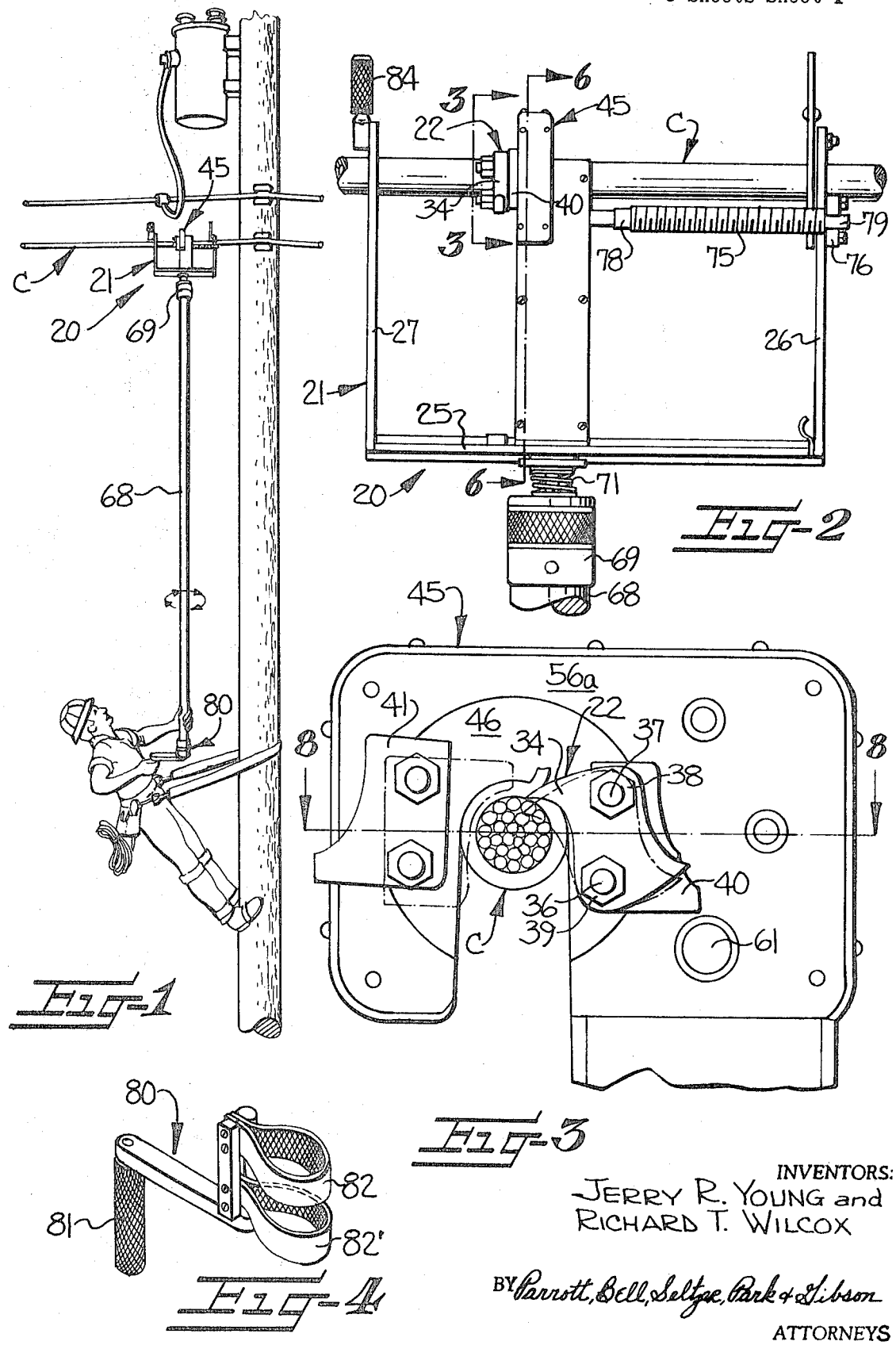

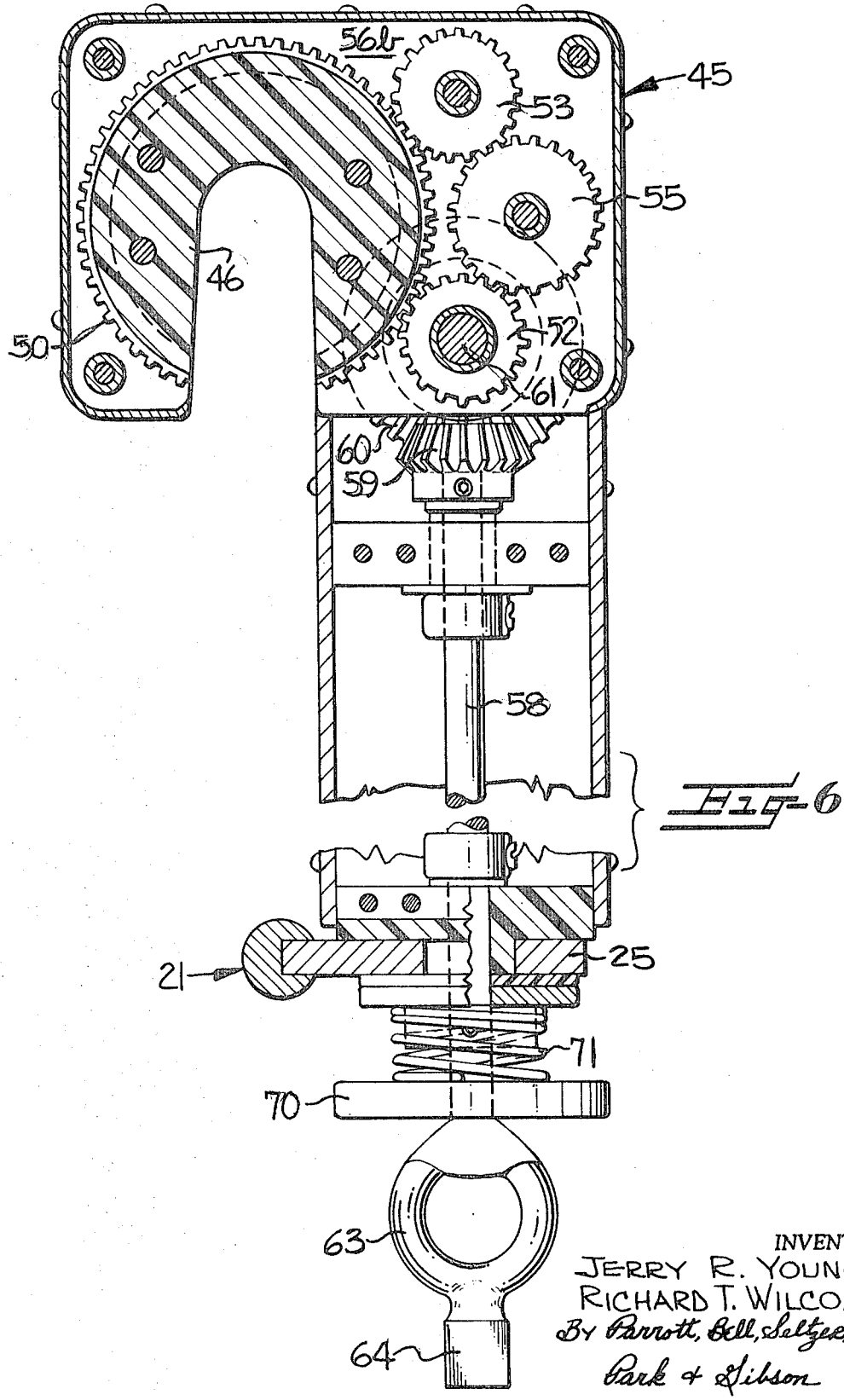

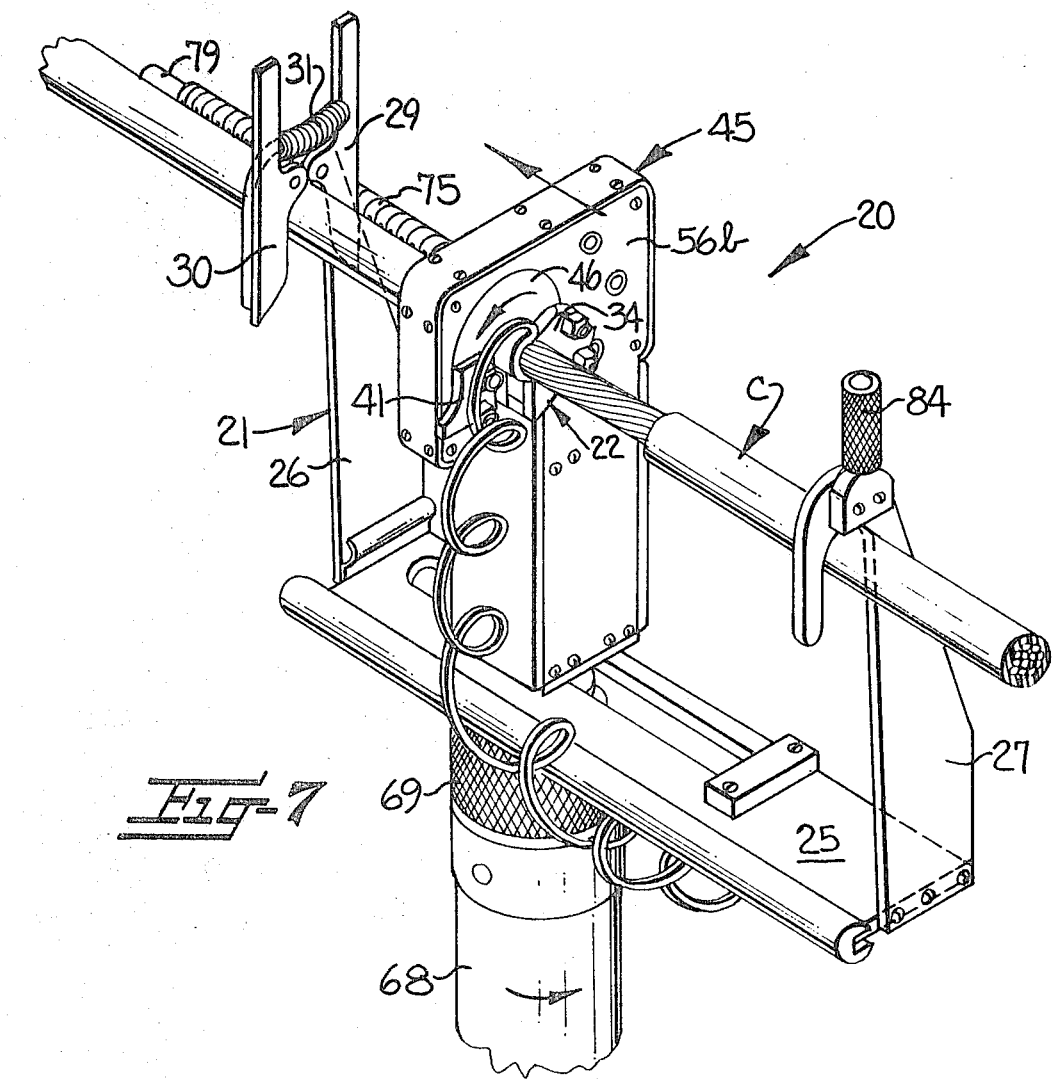
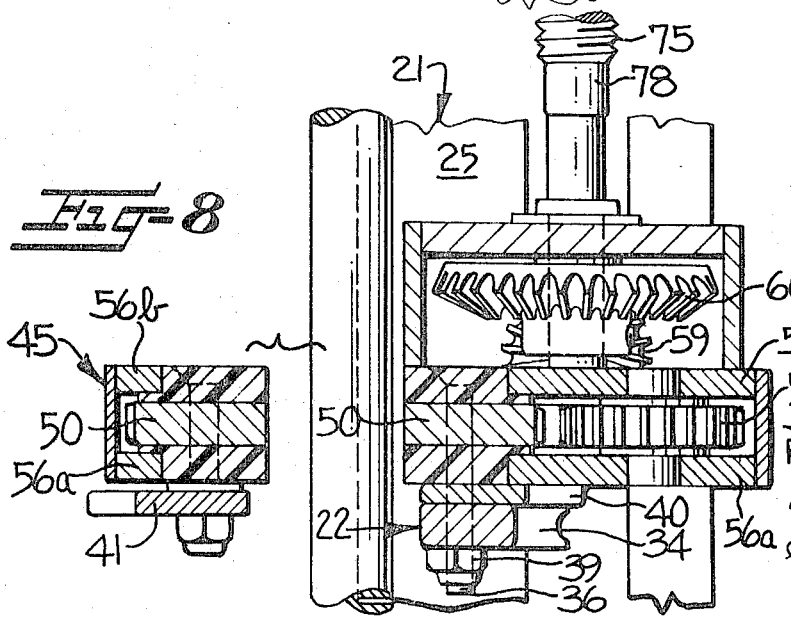

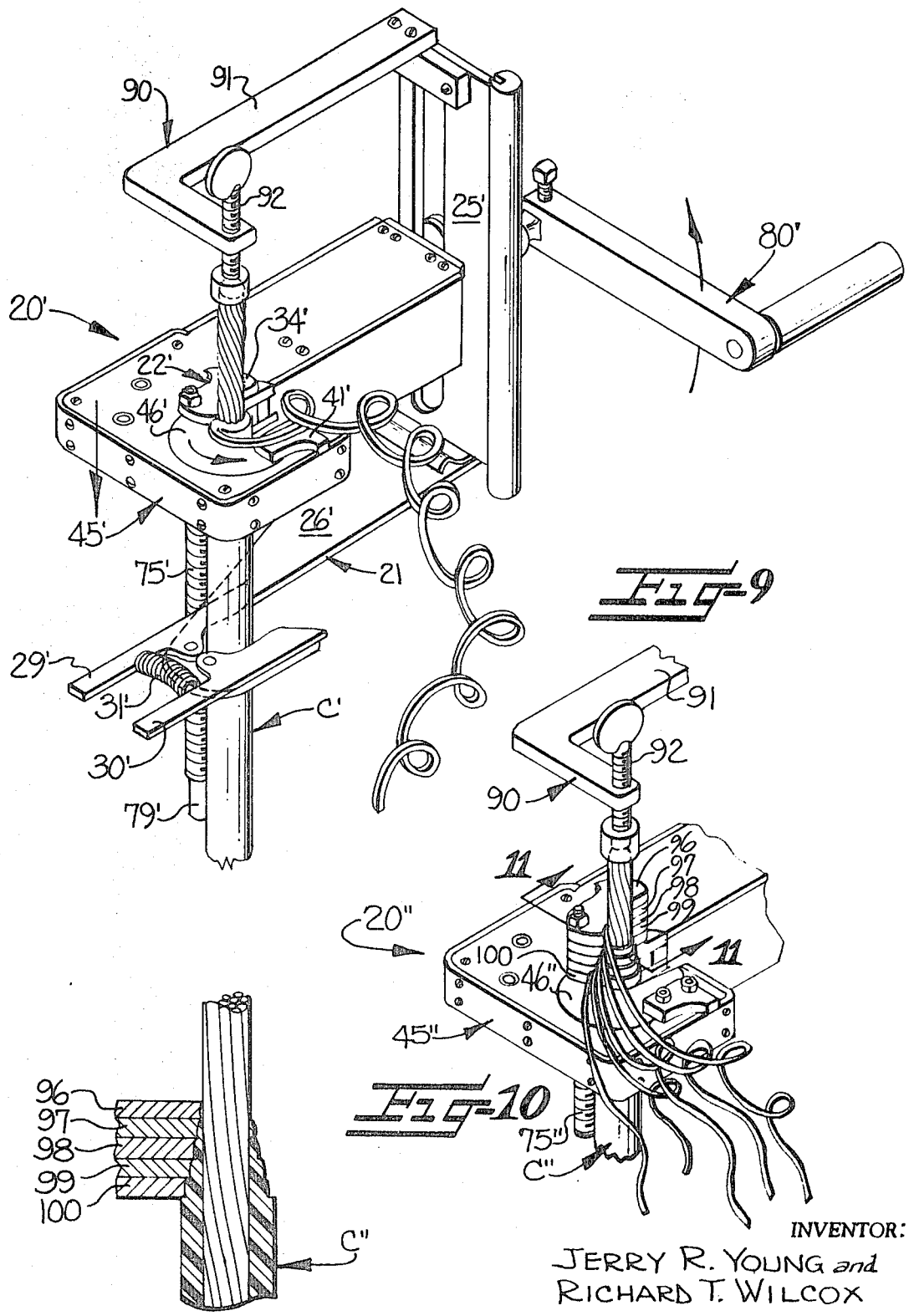

3,614,904  
INSULATION STRIPPING APPARATUS  
Jerry R. Young and Richard T. Wilcox, Charlotte, N.C., assignors to Utilities Research, Inc., Charlotte, N.C.  
Filed Jan. 20, 1970, Ser. No. 4,302  
Int. Cl. H02g 1/12  
U.S. Cl. 81—9.5 R  16 Claims

ABSTRACT OF THE DISCLOSURE

Apparatus for stripping insulation from an elongate insulated conductor in which an insulation cutter means mounted for movement relative to a conductor is driven in simultaneous and coordinated rotation about and translation along the longitudinal axis of the conductor so that the cutter means describes a spiral path relative to the conductor and strips insulation therefrom.

---

The removal of insulation from electrical wires, cable and the like has long been recognized as presenting one of the technical problems which must be dealt with in the electrical industry. Particularly in the power distribution industry, where larger sizes of wire and cable are used and cable frequently is exposed to ambient atmospheric conditions for extended periods of time, removal of insulation from such eletcrical conductors has heretofore been difficult, time consuming and in certain instances dangerous. Particular difficulty has been encountered in removing insulation at a point along a span of conductor between two spaced apart supports, as when a distribution line serving an area is to be tapped. Additional difficulty is encountered when an end-to-end joint of two electrical conductors is to be made, as the insulation removed from the ends to be joined must leave a carefully tapered shoulder.

Before the present invention, two approaches have been available for stripping of insulation under the circumstances briefly mentioned above. First, the traditional and most widely used approach is manual stripping of insulation by use of a knife or the like. Second, a proposed alternative is the use of a tool which may be positioned on a length of conductor intermediate two supports and which has a knife so positioned that entry of the knife into the insulation material is intended to cause both removal of insulation from the conductor and translation of the tool along the length of the conductor. This latter alternative does not acceptably overcome the deficiencies of manual stripping, as movement of the insulation engaging knife around and along the conductor to be stripped is not positively controlled.

With a view to overcoming the deficiencies and shortcomings discussed above, it is an object of the present invention to strip insulation from an elongate insulated conductor by driving an insulation cutter means positively in simultaneous and coordinated rotation about and translation along the longitudinal axis of a conductor so that the cutter means describes a spiral path relative to the conductor and removes insulation therefrom. In accomplishing this object, an insulation cutter means is mounted on a frame means for movement relative to a conductor engaged by the frame means and to the frame means. The insulation cutter means is positively driven in movement relative to the frame and insulated conductor, to accomplish the insulation stripping.

Yet another object of the present invention is to strip insulation from a portion of a conductor intermediate spaced supports therefor by positioning a frame and an insulation cutter means mounted on the frame to engage an insulated conductor at a selected location intermediate the two support points without requiring severing of the previously installed conductor. In accomplishing this object of the present invention, the frame and insulation cutter means are constructed and arranged so as to be open to one side thereof for receiving the previously installed conductor. As so constructed and arranged, the insulation cutter means is positively driven relative to an incremental length of the conductor at a desired location along a span thereof, providing positive removal of insulation while avoiding difficulties heretofore encountered with such insulation stripping.

Yet another object of the present invention is the removal of insulation adjacent a free end of a conductor in preparation for joining of the free end with another conductor. In realizing this object of the present invention, a severed free end of an insulated conductor to be stripped is received and secured by the stripping apparatus during the stripping operation, for positive positioning of the conductor relative to the insulation cutter means.

Some of the objects and advantages of the invention having been stated, others will appear as the description proceeds, when taken in connection with the accompanying drawings, in which:

FIG. 1 is a view illustrating the insulation stripping apparatus of the present invention in use to remove insulation from a portion of an insulated electrical conductor intermediate spaced supports therefor;

FIG. 2 is an enlarged elevation view of the insulation stripping apparatus in use in FIG. 1;

FIG. 3 is an enlarged end elevation view, partially in section, taken generally along the line 3—3 in FIG. 2 and particularly illustrating the insulation cutter means of the apparatus of this invention;

FIG. 4 is a perspective view of a crank means shown in use in FIG. 1 for driving the insulation stripping apparatus of the present invention;

FIG. 6 is an end elevation view, in partial section, through the apparatus of FIG. 2, taken generally along the line 6—6 in FIG. 2;

FIG. 7 is a perspective view, taken from a direction opposite the direction in which FIG. 5 is taken, showing the apparatus of FIGS. 1–6 in operation during stripping of insulation from an elongate insulated conductor;

FIG. 8 is a plan view, in partial section, through a portion of the apparatus of FIGS. 1–3, taken generally along the line 8—8 in FIG. 3;

FIG. 9 is a perspective view of a modified form of the apparatus of the present invention, in use;

FIG. 10 is a view similar to FIG. 9 illustrating a second modified form of apparatus in accordance with the present invention; and FIG. 11 is an enlarged section view through the second modified form of FIG. 10 and a conductor being stripped thereby.

Figure 5:
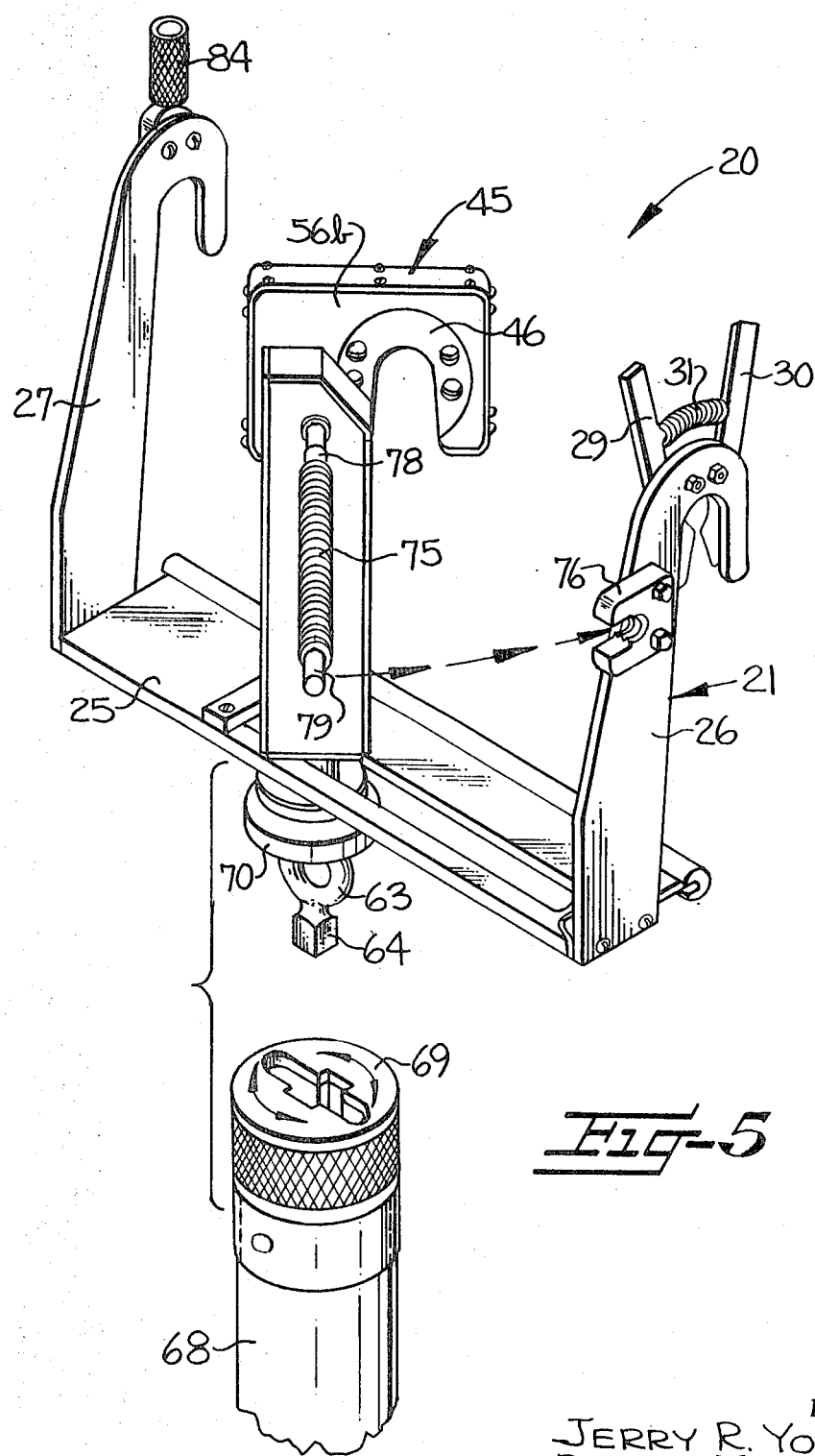
FIG. 5 is a perspective view of the insulation stripping apparatus of FIGS. 1–3, including an end portion of an elongate operating stick for the apparatus for the present invention.

Referring now more particularly to the drawings, the present discussion will proceed first with reference to insulation stripping apparatus particularly adapted for stripping insulation from a support spanning length of a conductor, as illustrated in FIGS. 1–8, where the apparatus is generally indicated by reference character 20. At a later point in this discussion, attention will be directed to modified forms of the apparatus 20, for accomplishing insulation stripping in other than spanning applications. Generally, the apparatus of the present invention comprises a frame means generally indicated by the reference character 21, insulation cutter means mounted on the frame means and generally indicated by the reference character 22, and means for driving the cutter means 22 in a particular manner.

The frame means 21 comprises an elongate guiding member 25 and conductor gripping means mounted on the guiding member 25 for securing the same to an insulated conductor to be stripped. The conductor gripping means additionally serves the function of positioning the guiding member 25 generally parallel to and spaced from the longitudinal axis of the engaged conductor. In the instance of the apparatus 20, particularly adapted for spanning portion insulation stripping, the conductor gripping means includes first and second hook members 26 and 27, each open to one side for receiving and engaging an insulated conductor intermediate the length thereof (FIGS. 5 and 7). Preferably, the first hook member 26 carries a pair of pivotally mounted insulation clamping members 29 and 30, which operate generally in pincher or scissor fashion to frictionally engage the insulation of a conductor to be stripped. In order to insure engagement of the members 29, 30 with the outer insulation layer of the conductor, a compression spring 31 acts therebetween to urge opposite end portions thereof together. As will be understood, the provision of the first and second hook members 26, 27, each opening to the lower side thereof, permits the frame means 21 to be positioned engaging an insulated conductor to be stripped at a selected location intermediate two support points therefor and without requiring severing of a previously installed conductor. Such positioning of the frame means 21 is illustrated, for example, in FIG. 1. As so positioned, the clamping members 29 and 30 are in frictional engagement with the insulation of an engaged cable, and restrain the frame means 21 against movement longitudinally of the conductor (FIG. 7).

The cutter means 22, mounted on the frame means 21 for movement relative thereto as will be described more fully hereinafter, includes an insulation knife 34 having a cutting edge and a chip guiding surface extending rearwardly therefrom. The insulation knife 34 is mounted, relative to a cable or conductor C engaged by the frame means 21, with the chip guiding surface extending generally tangentially of the diameter of the conductor (FIG. 3) and with the cutting edge of the knife 34 spaced closely adjacent to the outside diameter of the cable or conductor C. As so mounted, the cutting edge of the knife 34 penetrates into the body of insulation on the conductor C, for stripping of the insulation therefrom.

Provision is made for adapting the apparatus 20 of the present invention to multiple sizes of conductors or cable, through a particular mounting arrangement for the insulation knife 34. More particularly, the insulation knife 34 is secured to a drive means as described more fully hereinafter by means of a pair of studs 36, 37 and nuts 38 and 39 which engage the studs and hold the insulation knife 34 in place. An adaptor plate 40 is held in place adjacent the insulation knife 34, and the knife 34 is provided with cutting edges and chip guiding surfaces at both ends thereof. The cutting edges of the two ends are so arranged, relative to mounting holes which receive the mounting bolts 36 and 37, that the edges extend to different diametrical dimensions, as shown by the full line and phantom line views of FIG. 3. The adaptor plate 40 reduces the effective diameter of the open throat portion defined by the drive means for the insulation knife 34, as described more fully hereinafter. A cooperating secondary adaptor plate 41 is also provided and mounted on the drive means for cooperation with the insulation knife adaptor plate 40, as indicated by the full line and phantom line illustrations of FIG. 3. Such adaptation of the apparatus 20 permits the center about which the insulation knife 34 rotates to be maintained in alignment with the longitudinal axis of the conductor C being stripped, even though more than one size of conductor is being stripped.

In accordance with important features of the present invention, and in order to drive the insulation cutter means positively in simultaneous and coordinated rotation about and translation along the longitudinal axis of a conductor engaged by the frame means 21, the apparatus 20 includes drive means having a cutter mounting head movable along the elongate guide member 25 of the frame means 21. The cutter mounting head, generally indicated at 45, has a cutter receiving element 46 having an opening to one side thereof for receiving an insulated conductor intermediate the length thereof. The opening to one side of the cutter receiving element 46 is aligned with an opening through the side of the cutter mounting head 45 (as shown in FIGS. 3 and 5) for introduction and removal of a conductor to be stripped. The cutter receiving element 46 is mounted in the cutter mounting head 45 for rotation relative thereto and, on such rotation to misalign the side openings therein, functions additionally to retain an engaged conductor C in position for insulation stripping.

As illustrated in FIG. 6, cutter rotating means are provided for driving the cutter receiving element 46 in rotation about the longitudinal axis of an engaged conductor. In particular, the cutter receiving element 46 is provided with an interrupted, part-circular driven gear 50 extending around substantially the entire periphery thereof. The driven gear 50 is engaged by a pair of driving gears 52 and 53, coupled together by an idler gear 55. The driving gears 52, 53 and idler gear 55 are enclosed within the cutter mounting head 45 and rotate about axes provided by axles engaging sidewall 56a, 56b of the cutter mounting head 45. Upon the driving gear 52 being driven in rotation, as described more fully hereinafter, the second driving gear 53 moves therewith and, by meshing engagement of the driven gear 50 therewith, rotates the cutter receiver element 46. The driving gears 52 and 53 are rotatable about centers spaced apart a distance sufficient to insure that at least one of the driving gears is enmeshed with the driven gear 50 at all times during operation of the apparatus 20.

Rotation of the driving gear 52 results from transmittal of rotation thereto through a drive train including a drive shaft 58 extending within the cutter mounting head 45 and a set of bevel gears 59 and 60. A driving bevel gear 59 is secured to the upper end of the drive shaft 58, and meshes with a driven bevel gear 60 which supplies rotational motive force to the first driving gear 52 for the cutter mounting means through a mounting shaft 61 to which the gear 52 is secured for rotation.

The lower extremity of the drive shaft 58 is provided with means for coupling the drive shaft to an appropirate mechanism supplying rotational motive force. In particular, the lower extremity of the drive shaft 58 is provided with a ring portion 63 having a square drive termination 64. The square drive termination 64 may be engaged by a number of appropriate drive means, such as manually operated wrenches, air driven wrenches and the like. However, a particularly favorable manner of providing rotational motive force, in instances where insulation is to be stripped from a spanning portion of a previously installed conductor, is the use of an elongate operating stick such as a stick 68 (FIGS. 1, 2, 5 and 7). Such an elongate operating stick 68 may be generally of the type well known to electrical utility workers, and has a length sufficient to extend from a location adjacent an overhead conductor to within reach of an operator. The upper extremity of the operating stick is provided with a rotational drive coupling 69 (FIG. 5) having an opening therein to pass both the ring portion 63 and the square drive portion 64 of the lower extremity of the drive shaft 58. In order to insure that coupling of the elongate operating stick 68 to the apparatus 20 is maintained during use of the apparatus, the drive coupling 69 at the upper extremity of the stick includes an elongate slot for receiving the ring portion 63. Once the ring portion 63 has been received within the drive coupling 69, limited rotation of the drive coupling 69 relative to the ring portion 63 is permitted. As a result, the stick 68 becomes coupled with the drive shaft 58 and can be removed therefrom only by conscious effort. Such coupling is assisted by a coupling plate 70 (FIG. 6) encircling the drive shaft 58 and urged downwardly upon the coupling 69 of the stick 68 by a compression spring 71.

While it is apparent from the discussion to this point that the insulation knife 34 is driven positively in rotation about a conductor C engaged by the apparatus 20 of the present invention, it is an additional important feature of the present invention that cutter translation means are provided for translating the cutter receiving element along the longitudinal axes of an engaged conductor, with the cutter translating means being operatively coupled to the cutter rotating means for coordinating simultaneous movement of the cutter mounting head and receiving element in the two directions required to pass the knife 34 along a spiral path about the conductor C. In particular, the cutter translating means includes an elongate threaded member 75 supported from the cutter mounting head 45 for rotation about its longitudinal axis and a cooperating stationary nut element 76 secured to the first hook member 36 of the frame means 21. When the elongate threaded member 75 is in engagement with the nut member 76, rotation thereof relative the nut element 76 draws the cutter mounting head along the elongate guiding member 25, translating the insulation knife 34 along an engaged conductor C. For ease in achieving the desired arrangement, the elongate threaded member 75 preferably is an extension of the shaft 61 on which the bevel gear 60 is mounted. In order to facilitate release of the threaded member 75 from the nut element 76, to permit rapid return movement of the cutter mounting head 45 when desired, the elongate threaded member 75 preferably has reduced diameter portions 78 and 79 at opposite extremities thereof. Thus, when the cutter mounting head 45 has been traversed for the full distance provided by the threaded length of the member 75, one of the reduced diameter portions 78 or 79 enters into the nut element 76, preventing further translation of the cutter mounting head 45. Further, the reduced diameter portions of the elongate member 75 may be removed to one side of the nut element 76, due to the same having an opening to the side thereof (FIG. 5), permitting release of the drive means of the apparatus 20 from the positive translation provided by the threaded member 75.

In using the apparatus 20, as described to this point, for stripping of insulation from a conductor suspended overhead, the apparatus 20 has its greatest advantage in removal of insulation from primary wires. While such conductors typically are mounted above a transformer in most installations, FIG. 1 is intended to indicate such overhead operation of the apparatus 20. As there shown and described above, the drive means in this application includes an elongate operating stick 68. Where the operating stick is to be rotated manually, it is desirable that a manually operable crank means be operatively connected to one end of the operating stick for rotating the same about its longitudinal axes and thereby transmitting motion to the cutter rotating and translating means. As illustrated in FIGS. 1 and 4, the lower end of the operating stick 68 has a generally right circular cylindrical configuration and the crank means comprises an elongate crank member 80 having a laterally projecting handgrip 81 at one end thereof and at least one loop of flexible band material 82, 82' at the other end thereof. The loops 82 and 82' of band material are dimensioned to receive the lower end of the operating stick 68 and, on rotation of the crank member 80 relative thereto, will tighten about the elongate operating stick and effectively transmit rotation thereto.

An alternative arrangement for returning the cutter mounting head 45 to a desired position, where the full stroke obtainable by means of the threaded member 75 has not been employed, relies upon the use of a reversing crank handle 84 mounted on the second hook member 27. By grasping the ring member 63 of the drive shaft 58 with one hand and the crank element 84 with the other, the apparatus 20 may be manually flipped or rotated in such a manner as to move the cutter mounting head 45 in a desired direction While discussed to this point with particular reference to the configuration illustrated in FIGS. 1–8, which is particularly adapted for mid-span stripping of conductors, the present invention contemplates that apparatus according to this invention may be made of more general utility by the introduction of particular modifications. One such modification is illustrated in FIG. 9, where an apparatus 20' is shown which is adapted to remove insulation adjacent the free end of a conductor C' and wherein elements corresponding to elements described above have been identified by the same reference characters, with the addition of prime notation. For example, the apparatus 20' includes a first hook member 26' having clamping members 29' and 30' for engaging the conductor C'. The point of distinction between the apparatus 20' now to be described and the apparatus 20 described heretofore lies particularly in means provided for engaging a free end of a conductor C' to be stripped. More particularly, the conductor gripping means of the apparatus 20' includes an end cap member 90 mounted from a standard 91 by means of a thumb screw 92 or the like to be positioned in spaced relation to the one hook member 26' and to be generally aligned with the longitudinal axis of the conductor C' to be stripped. The end cap 90 receives and secures a severed free end of the insulation conductor C' maintaining the conductor in the required position for movement of the insulation knife 34' relative thereto. Further, the end cap member 90 maintains the multiple conductors of a cable conductor in the desired assembled relationship during the stripping operation.

The present invention further contemplates adaptation to imparting a tapering shoulder to the insulation material surrounding a conductor being stripped when such is desired for an end joint of two conductors in which proper distribution of insulation stresses in wrapped insulation over the join must be insured. In particular, the apparatus 20" illustrated in FIG. 10 has a cutter means which includes a plurality of insulation knives, 96, 97, 98, 99 and 100 mounted side by side for engagement with insulation along a predetermined length of the conductor C". The remainder of the elements of the apparatus 20" are identified by reference characters as applied above with reference to the apparatus 20 and 20', with the addition of double prime notation. Each of the plurality of knives provided in the apparatus 20" has a cutting edge and the plurality of knives are mounted with the edges thereof lying generally in a right circular conical surface and spaced at varying radial distances outwardly of the diameter of a conductor engaged by the frame means of the apparatus. Thus, as the plurality of knives are driven in rotation about and translation along the longitudinal axes of the engaged conductors C", insulation is stripped from the conductor and a tapering shoulder is formed thereon.

In the drawings and specification, there have been set forth preferred embodiments of the invention, and although specific terms are employed, they are used in a generic and descriptive sense only and not for purposes of limitation.

We claim:

1. Apparatus for stripping insulation from an elongate insulated conductor in preparation for connection of another conductor thereto comprising:

frame means for engaging an elongate insulated conductor and for maintaining an engaged conductor with the logitudinal axis thereof in a predetermined orientation relative to said frame means, insulation cutter means mounted on said frame means for movement relative to an engaged conductor and to said frame means and for stripping insulation from the conductor, and means for driving said cutter means in simultaneous and coordinated rotation about and translation along the longitudinal axis of the conductor engaged by said frame means so that the cutter means describes a spiral path relative to the conductor and removes insulation therefrom.

2. Apparatus according to claim 1 wherein said cutter means includes an insulation knife having a cutting edge and a chip guiding surface extending rearwardly therefrom, said insulation knife being mounted relative to a conductor engaged by said frame means with said chip guiding surface extending generally tangentially to the conductor and said cutting edge spaced closely adjacent thereto.

3. Apparatus according to claim 1 particularly adapted for imparting a tapering shoulder to the insulation material surrounding the conductor being stripped and wherein said cutter means includes a plurality of insulation knives mounted side by side for engagement with insulation along a predetermined length of the conductor, each of said knives having a cutting edge and the plurality of knives being mounted with the edges thereof spaced at varying radial distances outwardly of a conductor engaged by said frame means for describing a generally conical surface on rotation of the knives about the conductor.

4. Apparatus according to claim 1 wherein said frame means comprises an elongate guiding member and conductor gripping means mounted on said guiding member for securing the same to an insulated conductor to be stripped and for positioning said guiding member generally parallel to and spaced from said longitudinal axis of said engaged conductor, said conductor gripping means including at least one hook member open to one side for receiving and engaging an insulated conductor intermediate spaced support points therefor.

5. Apparatus according to claim 4 particularly adapted for stripping insulation from a spanning length of a conductor and wherein said conductor gripping means includes a second hook member mounted on said guiding member in spaced relation to said one hook member and an opening to one side for receiving and engaging an insulated conductor intermediate spaced support points therefor so that said frame means is adapted to be positioned in engagement with an insulated conductor to be stripped at a selected location intermediate two support points therefor and without requiring severing of a previously installed conductor.

6. Apparatus according to claim 4 particularly adapted for stripping insulation from adjacent a free end of a conductor and wherein said conductor gripping means includes an end cap member mounted on said guiding member in spaced relation to said one hook member for receiving and securing a severed free end of an insulated conductor to be stripped.

7. Apparatus according to claim 1 wherein said frame means comprises an elongate guiding member and conductor gripping means mounted on said guiding member for securing the same to an insulated conductor to be stripped and for positioning said guiding member generally parallel to and spaced from said longitudinal axis of said engaged conductor and further wherein said drive means for said cutter means comprises a cutter mounting head movable along said elongate guiding member and including a rotatable cutter receiving element, cutter rotating means for rotating said cutter receiving element about said longitudinal axis of said engaged conductor, cutter translating means for translating said cutter mounting head along said guiding member and hence along the longitudinal axis of said engaged conductor and means operatively coupling said rotating and translating means for coordinating simultaneous movement of said cutter mounting head and receiving element.

8. Apparatus according to claim 7 wherein said cutter receiving element and said cutter mounting head have openings to one side for receiving an insulated conductor intermediate spaced support points therefor and said cutter receiving element is mounted for rotation relative to said cutter mounting head and for retaining said engaged conductor in position for insulation stripping.

9. Apparatus according to claim 8 wherein said cutter receiving element has an interrupted, part circular driven gear extending around substantially the entire periphery thereof and further wherein said cutter rotating means includes at least two coupled together driving gears for engaging said interrupted driven gear and rotatable about centers spaced apart a distance sufficient to insure that at least one of said driving gears is in mesh with said driven gear at all times during operation of said apparatus.

10. Apparatus according to claim 7 wherein said cutter translating means includes an elongate threaded member supported from said cutter mounting head for rotation about the longitudinal axis of said threaded member and a cooperating stationary nut element secured to said frame means for receiving said elongate threaded member so that rotation of said elongate threaded member relative to and in engagement with said nut element translates said cutter mounting head along said elongate guiding member.

11. Apparatus according to claim 10 wherein said elongate threaded member includes reduced diameter portions spaced therealong at opposite ends of a threaded portion thereof and wherein said nut element defines a side opening dimensioned to pass said reduced diameter portions and to retain said threaded portion of said elongate threaded member, whereby rapid movement of said cutter mounting head along said elongate guiding member is facilitated.

12. Apparatus for stripping insulation from a mid-span length of an elongate insulated conductor in preparation for connection of another conductor thereto comprising:

frame means including an elongate guiding member and a pair of hook members mounted in spaced relation on said guiding member for receiving and engaging an insulated conductor to be stripped, said hook members positioning said guiding member generally parallel to and spaced from the longitudinal axis of an engaged conductor at a location therealong intermediate two remote support points therefor, said frame means further including means for securing said guiding and hook members against movement longitudinally along said engaged conductor, mounting means including a mounting head movable along said guiding member in translation relative to said engaged conductor and a receiving element supported by said mounting head for movement therewith and for rotation relative to said mounting head and relative to said engaged conductor about said longitudinal axis thereof, said mounting head and receiving element being open to one side for receiving an insulated conductor intermediate spaced support points therefor, insulation cutter means mounted on said receiving element for movement therewith relative to said engaged conductor and for stripping insulation from said engaged conductor, and drive means including cutter rotating means for rotating said receiving element and said cutter means about said longitudinal axis of said engaged conductor and cutter translating means for moving said mounting head and said cutter means longitudinally along said guiding member and said engaged conductor in predetermined coordination with rotation of said cutter means so that said cutter means describes a spiral path relative to the conductor and removes insulation therefrom.

13. Apparatus according to claim 12 wherein said drive means is particularly adapted for operation of said cutter means along a conductor suspended overhead and wherein said drive means includes an elongate operating stick having a length sufficient to extend from a location adjacent an overhead conductor to within reach of an operator and manually operable crank means operatively connected to one end of said operating stick for rotating the same about the longitudinal axis thereof and thereby transmitting motion to said cutter rotating and translating means.

14. Apparatus according to claim 13 wherein said operating stick has a generally right circular cylindrical configuration at said one end and said crank means comprises an elongate crank member having a laterally projecting handgrip at one end thereof and having a loop of flexible band material at the other end thereof, said loop of band material being dimensioned to receive said one end of said operating stick and being tightened thereabout on rotation of said crank member.

15. Apparatus according to claim 12 wherein said drive means includes a separable driving member and coupling means for transferring rotational motive force, said coupling means comprising an integral driven member having a shaft for mounting said driven member for rotation about a predetermined axis, a ring portion disposed at an extremity of said shaft generally in a plane including said predetermined axis and defining a central opening extending generally perpendicular to said plane, and a stud portion extending from said ring portion generally in alignment with said predetermined axis and remote from the juncture of said shaft and ring portion, said stud portion having a regular cross-sectional configuration adapted for connection with a wrench and the like, and wherein said driving member includes means for engaging said driven member and delivering rotational motive force thereto.

16. Apparatus for stripping insulation from a free end of an elongate insulated conductor in preparation for connection of another conductor thereto comprising:

frame means including an elongate guiding member, a hook member mounted on said guiding member for receiving and engaging an insulated conductor to be stripped, and an end cap member mounted on said guiding member and spaced from said hook member for receiving and engaging a free end of an engaged conductor, said hook and end cap members positioning said guiding member generally parallel to and spaced from the longitudinal axis of said engaged conductor, said frame means further including means for securing said engaged conductor against longitudinal movement relative thereto, mounting means including a mounting head movable along said guiding member in translation relative to said engaged conductor and a receiving element supported by said mounting head for movement therewith and for rotation relative to said mounting head and relative to said engaged conductor about said longitudinal axis thereof, insulation cutter means mounted on said receiving element for movement therewith relative to said engaged conductor and for stripping insulation from said engaged conductor, and drive means including cutter rotating means for rotating said receiving element and said cutter means about said longitudinal axis of said engaged conductor and cutter translating means for moving said mounting head and said cutter means longitudinally along said guiding member and said engaged conductor in predetermined coordination with rotation of said cutter means so that said cutter means describes a spiral path beginning at the conductor free end and extending about and along the conductor and removes insulation therefrom.

References Cited
UNITED STATES PATENTS

| | | | |
|---|---|---|---|
| 1,165,176 | 12/1915 | Hornor | 30—90.6 |
| 3,204,495 | 9/1965 | Matthews | 81—9.5 R |

ROBERT C. RIORDON, Primary Examiner

R. V. PARKER, JR., Assistant Examiner